(12) United States Patent
Russell et al.

(10) Patent No.: US 11,769,420 B2
(45) Date of Patent: Sep. 26, 2023

(54) LIVE OPERATING SYSTEM EXAMINATION ENVIRONMENT

(71) Applicant: RED HAT, INC., Raleigh, NC (US)

(72) Inventors: Randolph Russell, Raleigh, NC (US); Gregory James Kable, Canberra (AU); George Henry Maine, Sunnyvale, CA (US); Curtis Scott Rempel, Edmonton (CA)

(73) Assignee: Red Hat, Inc., Raleigh, NC (US)

( * ) Notice: Subject to any disclaimer, the term of this patent is extended or adjusted under 35 U.S.C. 154(b) by 317 days.

(21) Appl. No.: 16/988,358

(22) Filed: Aug. 7, 2020

(65) Prior Publication Data

US 2022/0044581 A1 Feb. 10, 2022

(51) Int. Cl.
| | |
|---|---|
| G09B 7/00 | (2006.01) |
| G06F 9/4401 | (2018.01) |
| H04L 9/40 | (2022.01) |
| G06F 13/16 | (2006.01) |
| G06F 13/42 | (2006.01) |

(52) U.S. Cl.
CPC .............. G09B 7/00 (2013.01); G06F 9/4406 (2013.01); G06F 9/4416 (2013.01); G06F 13/1668 (2013.01); G06F 13/4282 (2013.01); H04L 63/08 (2013.01); H04L 63/10 (2013.01); G06F 2213/0042 (2013.01)

(58) Field of Classification Search
CPC ....................................................... G09B 7/00
See application file for complete search history.

(56) References Cited

U.S. PATENT DOCUMENTS

| | | | | |
|---|---|---|---|---|
| 2007/0136568 A1* | 6/2007 | Ding | ............... | G06F 9/4406 |
| | | | | 713/1 |
| 2009/0307763 A1* | 12/2009 | Rawlins | ............... | G06F 11/2294 |
| | | | | 714/E11.002 |
| 2010/0205420 A1* | 8/2010 | Chen | ............... | G06F 11/2294 |
| | | | | 713/1 |

OTHER PUBLICATIONS

"Lernstick" (Oct. 10, 2014). lernstick abstract englished, 4 pages.
"Lernstick Exam Environment" (Oct. 15, 2014). Softpedia, 2 pages.
Frankl, G. et al. (2019). "Guaranteeing High Availability of the ,, Secure Exam Environment" (SEE) Proceedings of the 10th International Conference on Computer Supported Education (CSEDU 2018), pp. 130-136.
"GeoGebra Exam Stick" (Nov. 1, 2018). 19 pages.
Frankl, G. et al. (2011). "The "Secure Exam Environment" for Online Testing at the Alpen-Adria-Universität Klagenfurt / Austria Why Online-Testing?" ResearchGate, 11 pages.

* cited by examiner

Primary Examiner — Henry Tsai
Assistant Examiner — Juanito C Borromeo
(74) Attorney, Agent, or Firm — Womble Bond Dickinson (US) LLP

(57) ABSTRACT

A method includes receiving, by a processing device of a client device from an external storage device, an operating system image, the operating system image to provide a testing environment for the client device; loading the operating system image into memory of the client device; and providing, by the processor of the client device, testing information via the testing environment.

20 Claims, 8 Drawing Sheets

LIVE OPERATING SYSTEM EXAMINATION ENVIRONMENT

TECHNICAL FIELD

Aspects of the present disclosure relate to examination software, and more particularly, to a live operating system examination environment.

BACKGROUND

Examinations can be provided remotely to users of a computer system. Remote examinations may be proctored and may include certain restrictions on the test-taker's actions during the exam. These remote examinations can be provided online through a user's browser or through software installed locally on the test-taker's device.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
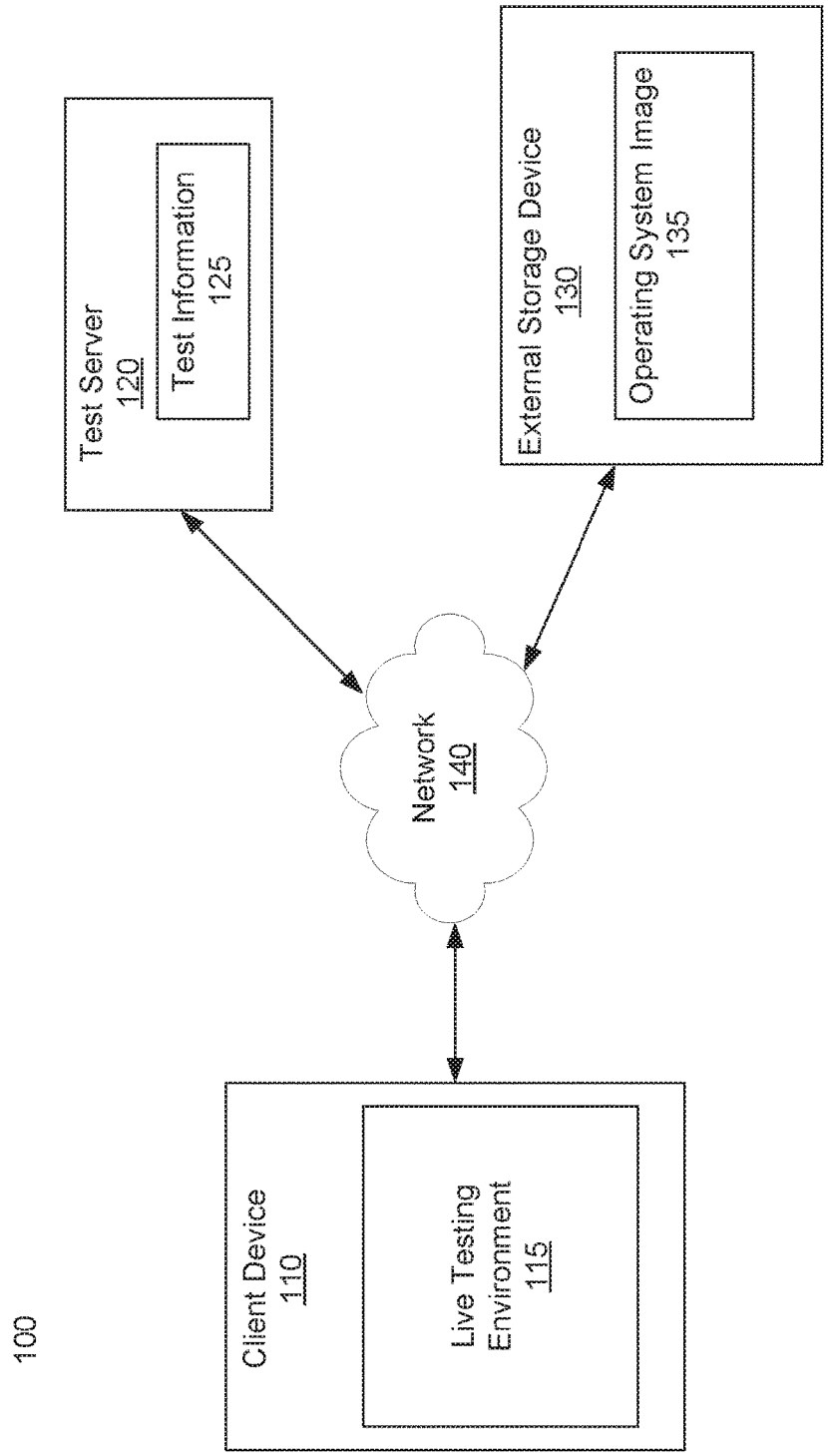
FIG. 1 is a block diagram that illustrates an example computer architecture, in accordance with some embodiments.

Remote examinations can provide availability of exams for large geographic areas and can make examinations available even when in person test taking is unavailable. Remote examinations may include multiple choice exams, essay exams, practical skills exams, etc. For example, technical exams for certification with operating system technology, virtual machine technology, or other computer systems may include utilizing a variety of software tools to demonstrate skills with the underlying technology. In any instance of remote examination, restrictions may be set (e.g., by a test publisher) to prevent access to particular computer resources. For example, an exam may prohibit use of outside materials or assistance from others. The remote examination software may therefore need to restrict access to those resources that are prohibited under the examination rules. If the restrictions of the remote examination environment are easily circumvented, then the efficacy of the exam may be undermined and the program may be devalued due to marginal candidates clearing the exam requirements by using outside help.

Conventional examination environments include locking down the computer using the browser, or through software downloaded and executing locally on the computer. Locking down the computer using the browser may include expanding the browser in which the examination is being taken to full screen and including browser plug-ins to restrict certain actions. However, the operating system on which the browser is executing may circumvent browser restrictions because the operating system fundamentally controls resource access. Therefore, examinees may find workarounds to the restrictions. An application running on the operating system to lock the computer down may limit access to other computer resources from within the application. Again, however, a test taker may configure the operating system on which the application executes to circumvent the restrictions of the application.

These conventional exam environments have several issues. First, as discussed above, a tech savvy test taker may circumvent the restrictions of the examination environment. Second, there may be significant issues with compatibility between browsers, plugins, and operating systems. Third, test-takers may be averse to downloading software to their personal computers that are intended to control the test-taker's device.

Aspects of the disclosure address the above-noted and other deficiencies by providing an operating system for use during exams that remains solely in memory of the test-taker's device. A specially-configured live USB operating system environment, or a live network boot operating system provides an operating system for exam delivery while leaving examinees' systems intact and untouched for normal usage. The live operating system environment may be an operating system that is booted from an external storage medium connected via USB (or network for network boot) and loaded into a computer's random access memory (RAM). Rather than storing the operating system and associated files and modules in persistent storage to be accessed by a kernel of the operating system, the entire operating system including kernel, modules, and file systems may be loaded into structures in the running computer's memory. Thus, an examinee may simply boot their computer into the live environment, take an examination, and then restart the computer to return to normal use.

The live operating system environment may be designed for providing a testing environment. The live operating system environment may restrict the ways in which an examinee can use the computer while in the live environment. For example, access to local file systems (i.e., file systems in local storage) could be restricted. In another example, access to alternate desktops may be prevented. In another example, processing logic of the live environment may detect attached hardware and whether the environment is being run in memory or as a virtual machine. Additionally, network access may be limited to resources required for exam delivery and no others. Keystroke combinations may be controlled at the operating system level. Therefore, the live environment may be restricted to be used in the ways that the test publisher intends and permits. To further safeguard against technically savvy candidates circumventing exam restrictions put in place by the test publisher, the storage medium (e.g., a USB flash drive) storing the operating system image may be fully encrypted in a manner that renders the content of the storage medium unreadable when not in operation. For example, the storage medium may include full disk encryption such that the storage medium can only be used to boot into the operating system and load the live environment into memory of the computer system. The contents of the storage medium may be otherwise inaccessible.

In embodiments, the processing logic of the live environment may provide information to the test publisher, the proctor, monitor, or other third party to establish and track provenance of an operating system image and its use. For example, the processing logic may provide an identifier of the examinee whose image is being used, when it is being used, and on what device. The processing logic may further provide options for contacting technical support and for determining if the user's hardware and network are sufficient to support examinations.

Accordingly, embodiments of the present disclosure provide for a more reliable examination platform for connecting to external resources because the environment is known. Similarly, compatibility issues are obviated because the entire software stack from operating system to applications and browsers are provided together in the live environment. The test publisher may control the testing environment more completely and prevent operating system level workarounds to testing restrictions because the operating system itself is provided to the examinee by the test publisher as a live environment. Furthermore, examinees do not have to download software to their personal device because the live environment runs completely in memory.

FIG. 1 depicts a high-level component diagram of an illustrative example of a computer system architecture 100, in accordance with one or more aspects of the present disclosure. One skilled in the art will appreciate that other computer system architectures 100 are possible, and that the implementation of a computer system utilizing examples of the invention are not necessarily limited to the specific architecture depicted by FIG. 1.

As shown in FIG. 1, computer system architecture 100 includes a client device 110, a test server 120 and an external storage device 130 connected by (e.g., may be operatively coupled, communicatively coupled, may communicate data/messages with each other) a network 140. The test server 120 may be any type of server, such as an application server, a web server, an FTP server, or any other type of server with which user device 110 can communicate. The test server 120 may be a server of a test publisher and may store test information 125 to be provided to the client device 110 for an examination being taken by an examinee using the client device 110.

The external storage device 130 may be any type of storage device, such as a USB storage device (e.g., a flash drive), an external disk hard drive, a server, a data store, etc. External storage device 130 may store an operating system image 135. The operating system image 135 may include all resources necessary to execute an operating system, including an operating system kernel, operating system modules, operating system files, and any other necessary resources.

Client device 110 may be any data processing device, such as a desktop computer, a laptop computer, a mainframe computer, a personal digital assistant, a rack-mount server, a hand-held device or any other device configured to process data. Client device 110 may load the operating system image 135 from external storage device 130 into memory of the client device to execute as a live operating system environment. The operating system image 135 may be designed as an examination environment, referred to herein as a live testing environment 115 during execution on the client device 110. The live testing environment 115 may have restricted access to local file systems, network resources, and other resources prohibited by the test publisher. In one example, live testing environment may be a real-time operating system and may be a highly stripped down operating environment with limited operating system functionality, and/or may not include traditional operating system facilities, etc.

Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of client device 110, test server 120, and external storage device 130.

In embodiments, client device 110 may execute a live testing environment 115. The live testing environment 115 may be a live operating system (e.g., operating system image 135) executed in memory (e.g., random access memory (RAM)) of the client device 110. The live testing environment 115 may provide a platform for examination and may restrict access to resources of the client device 110. For example, the live testing environment 115 may prevent access to local file systems of the client device 110 or may restrict network access only to networks that are needed for receiving, transmitting, or accessing resources allowed by the testing publisher. Further details regarding live testing environment 115 will be discussed with respect to FIGS. 2-7 below.

Figure 2:
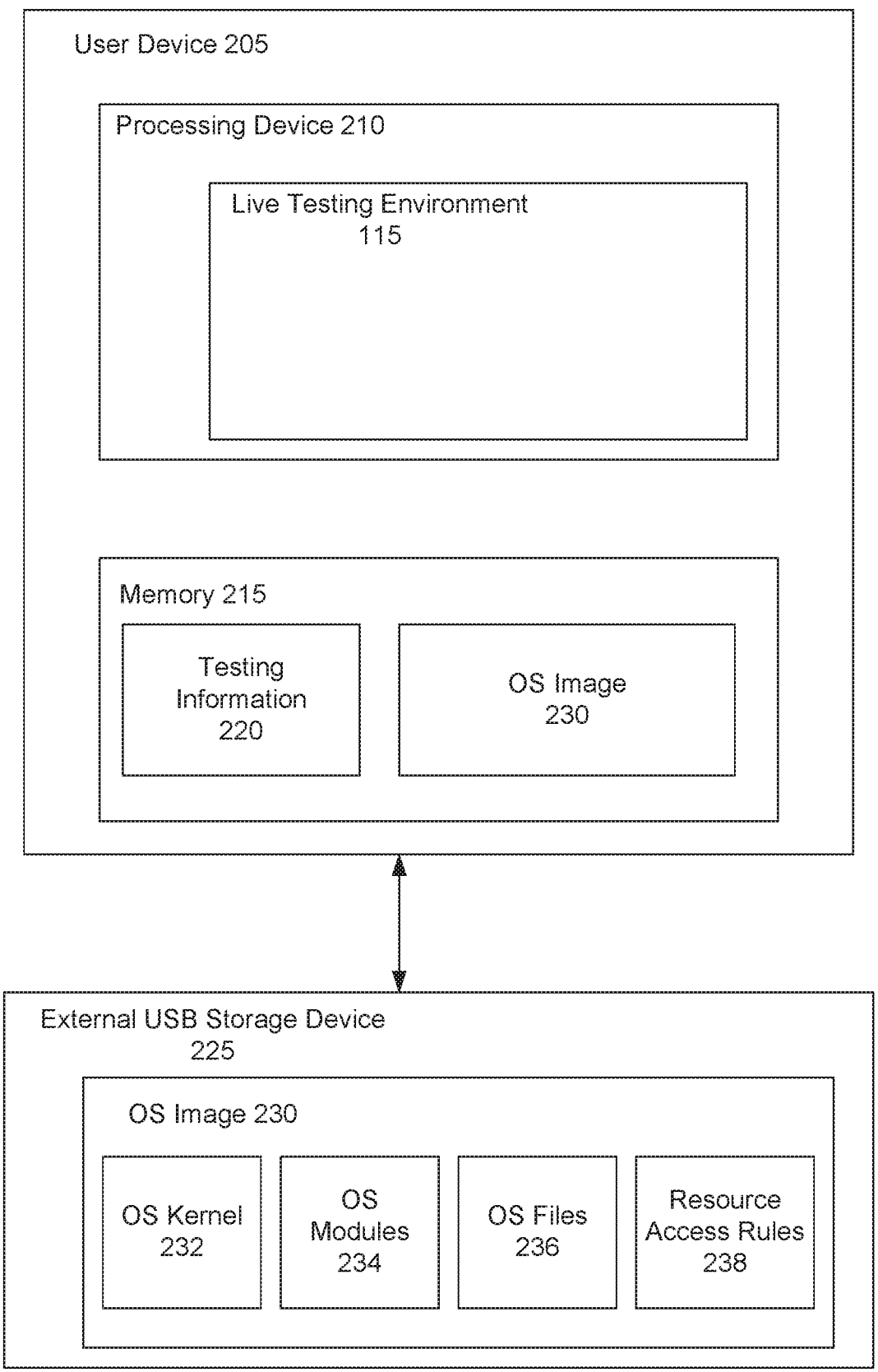
FIG. 2 is a block diagram that illustrates an example of a computer system executing a live operating system examination environment, in accordance with embodiments of the disclosure.

FIG. 2 is an illustration of an example of a computer system 200 executing a live testing environment 115, in accordance with one or more aspects of the present disclosure. Computer system 200 may include a user device 205 coupled to an external USB storage device 225 (e.g., via a USB port connection). The external USB storage device 225 may be any type of storage device, such as flash storage, disk storage, or other storage medium, connected to the user device 205 through a USB connection. The external USB storage device 225 may include an operating system image 230. The operating system (OS) image 230 may include an OS kernel 232, OS modules 234, OS files 236, resource access rules 238 and any other resources required by the OS kernel 232. The OS image 230 may be designed to execute as a live operating system (e.g., live testing environment 115) in which an examinee can access and take an examination. The resource access rules 238 of the OS image 230 may define the limits of resource access for examination purposes. For example, a test publisher may want an examination to be closed book with no outside resources allowed to help the examinee during the examination. Therefore, the resource access rules 238 may be configured to prevent access to local file systems, restrict network access, monitor the device on which the OS image 230 is loaded and executed, and any other restrictions necessary to conform use to the test publisher's permissions.

In one example, the user device 205 may be booted using the OS image 230 from the external USB storage device 225. For example, upon starting the user device 205, the user/examinee may select the external USB storage device 225 as the device from which to boot the user device. The user device 205 may then retrieve the OS image 230 from the external USB storage device 225 and load the OS image 230 into memory 215 of the user device 205. In one example, the entire OS image 230 is loaded into memory and none of the OS image 230 is installed in storage. Therefore, the OS image 230 may run as a completely live operating system. The live operating system of the OS image 230 as executed by processing device 210 may be referred to as a live testing environment 115. The live testing environment 115 may provide the user device 205 with access to a test server. The live testing environment 115 may cause the processing device 210 to retrieve testing information 220 from the test server and store the testing information 220 in memory 215. The testing information 220 may be used by the examinee to perform the examination.

In one example, the examinee (or other user) may download the OS image 230 to the external USB storage device 225 in order to boot the user device 205 with the OS image 230 as a live operating system in memory 215 of the user device 210. In another example, the test publisher, or other third party may provide the external USB storage device 225 to the examinee with the OS image 230 already stored thereon.

Figure 3:
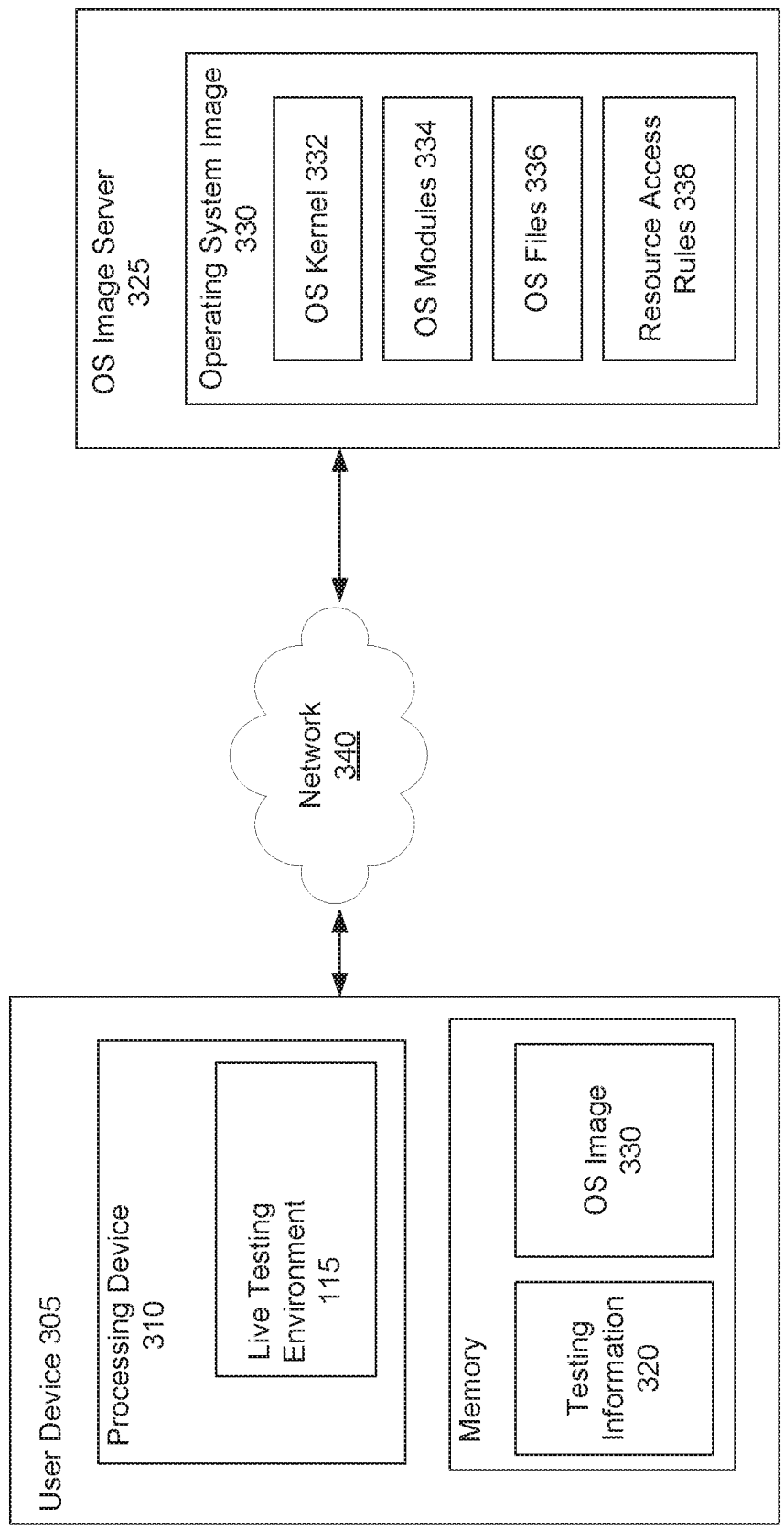
FIG. 3 is a block diagram illustrating another example of a computer system executing a live operating system examination environment, in accordance with some embodiments.

FIG. 3 is an illustration of an example of a computer system 300 executing a live testing environment 115, in accordance with one or more aspects of the present disclosure. Computer system 300 may include a user device 305 coupled to an OS image server 325 via network 340. The OS image server 325 may be may be any type of server, such as an application server, a web server, an FTP server, or any other type of server. The OS image server 325 may store an operating system image 330. The OS image 330 may include an OS kernel 332, OS modules 334, OS files 336, resource access rules 338 and any other resources required by the OS kernel 332. The OS image 230 may be designed to execute as a live operating system (e.g., live testing environment 115) in which an examinee can access and take an examination. The resource access rules 338 of the OS image 330 may define the limits of resource access for examination purposes. The resource access rules 238 may be configured to prevent access to local file systems, restrict network access, monitor the device on which the OS image 230 is loaded and executed, and any other restrictions necessary to conform use to the test publisher's permissions. Because the live testing environment 115 is an operating system, access to resources, system calls, and other fundamental resource control may be defined and controlled according to the testing restrictions required by the examination.

In one example, the user device 305 may be booted over the network 340 using the OS image 330 from the OS image server 325. For example, upon starting the user device 305, the user/examinee may select an option for a network boot of the device. The user device 305 may then retrieve the OS image 330 from the OS image server 325 and load the OS image 330 into memory 315 of the user device 305. In one example, the entire OS image 330 is loaded into memory and none of the OS image 330 is installed in storage. Therefore, the OS image 330 may run as a completely live operating system. The live operating system of the OS image 330 as executed by processing device 310 may be referred to as a live testing environment 115. The live testing environment 115 may provide the user device 305 with access to a test server. The live testing environment 115 may cause the processing device 210 to retrieve testing information 220 from the test server and store the testing information 220 in memory 215. The testing information 320 may be used by the examinee to perform the examination.

Figure 4:
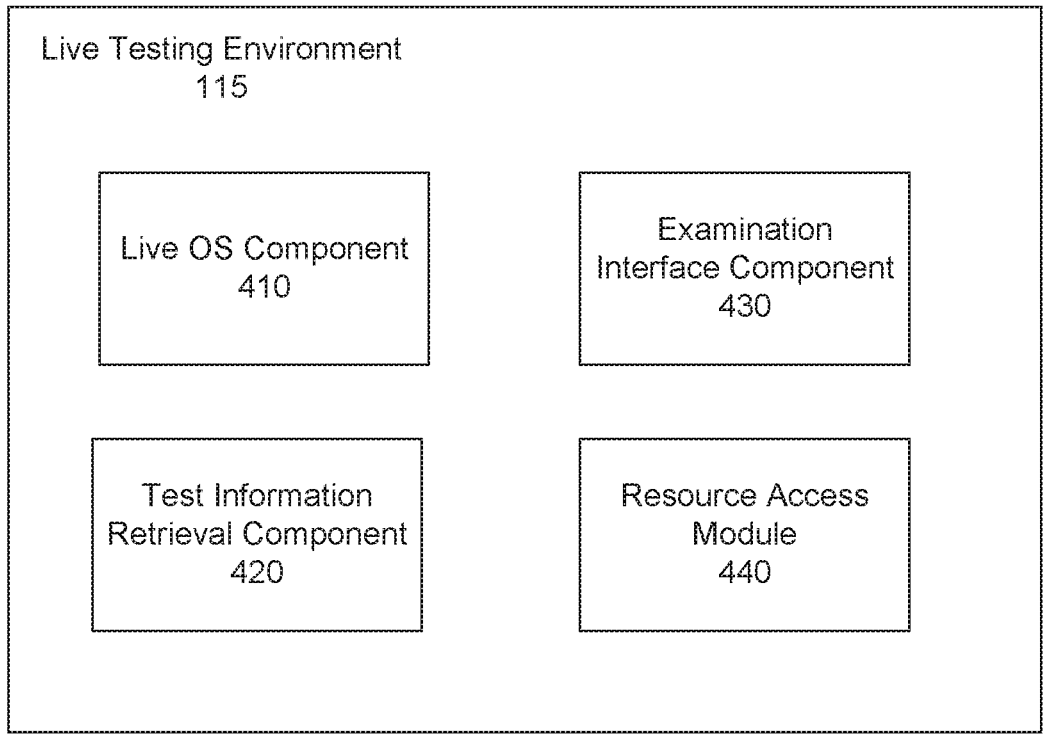
FIG. 4 is a block diagram of an example of a live operating system examination environment, in accordance with some embodiments.

FIG. 4 illustrates a component diagram of an example live testing environment 115, according to some embodiments. The live testing environment 115 includes a live OS component 410, a test information retrieval component 420, an examination interface component 430, and a resource access module 440. The live OS component 410 may execute a live OS as a platform for providing a testing environment to an examinee. The live OS component 410 may load and run the live OS entirely in memory of a computing device.

The test information retrieval component 420 may retrieve test information to be presented to an examinee using the live testing environment 115. The test information retrieval component 420 may transmit a request to a test server for test information. The test server may be a server of a test publisher, test administrator, or other testing authority. The test information retrieval component 420 may then receive the test information from the test server. The test information may include exam instructions or other information for an examinee to complete an exam.

The examination interface component 430 may provide an interface to an examinee using the live testing environment 115. The interface may include a file system interface (e.g., a command line interface, a graphical interface, etc.). The interface may also include one or more application interfaces to be used during examination in the live testing environment 115. The resource access module 440 may include rules and restrictions for access to computer resources from within the live testing environment 115. The resource access module 440 may include portions of the live operating system that have been modified to limit certain actions and/or access to restricted materials according to the test publisher.

Figure 5:
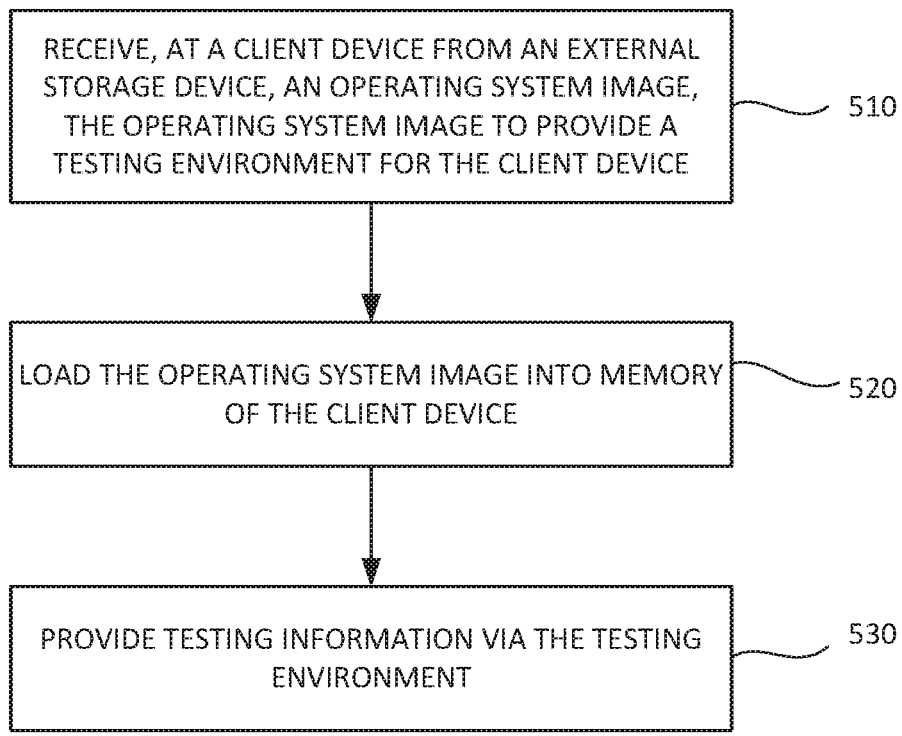
FIG. 5 is a flow diagram of a method of executing a live operating system examination environment, in accordance with some embodiments.

FIG. 5 is a flow diagram of a method 500 of executing a live operating system testing environment, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by a live testing environment 115, as discussed with respect to FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic receives an operating system image, the operating system image to provide a testing environment to a user of a client device. The operating system image may include a stack of software from the operating system kernel to applications executing on the operating system. The stack of software may provide the testing environment in which an examinee is to perform an exam. The testing environment may include restrictions on the examinee's use of the operating system and computer resources. For example, the testing environment may control keystroke combinations and end user interactions, prohibit unpermitted networks and network resources, and control user activity on the computer itself. The processing logic may retrieve the operating system image from an external USB storage device, a remote server (e.g., network boot), or other storage device.

At block 520, the processing logic loads the operating system image into memory of the client device. In one example, the processing logic may determine to boot the client device using the operating system image and then load the operating system image directly into the memory of the client device. The operating system image and testing environment may therefore be a live environment that is local only in memory of the client device. Upon power down or restart of the computer, the operating system image may no longer be in memory and the user may continue normal use of the resident operating system on their device. In one example, a kernel of the operating system image is first loaded into memory and may then retrieve the remaining files (e.g., OS modules, OS file systems, etc.) from the external storage device and load them into memory. In one embodiment, once the operating system image is loaded and the testing environment is booted up, the processing logic may request the examinee to login to a scheduled exam using login credentials assigned to the examinee. In one example, the testing environment may prevent access to one or more computer resources in view of a testing policy. The testing policy may be defined by the exam publisher.

At block 530, the processing logic provides testing information to the user of the client device via the testing environment. Once the live environment is up and running, the processing logic may request testing information associated with an examination. For example, after the examinee logins to a scheduled exam, the processing logic uses the credentials provided to retrieve testing information corresponding to the scheduled exam. The testing information may include exam instructions and/or any other test resources required for the corresponding exam. In one example, the processing logic may request and receive the testing information from a remote server (e.g., using credentials provided from the examinee).

Figure 6:
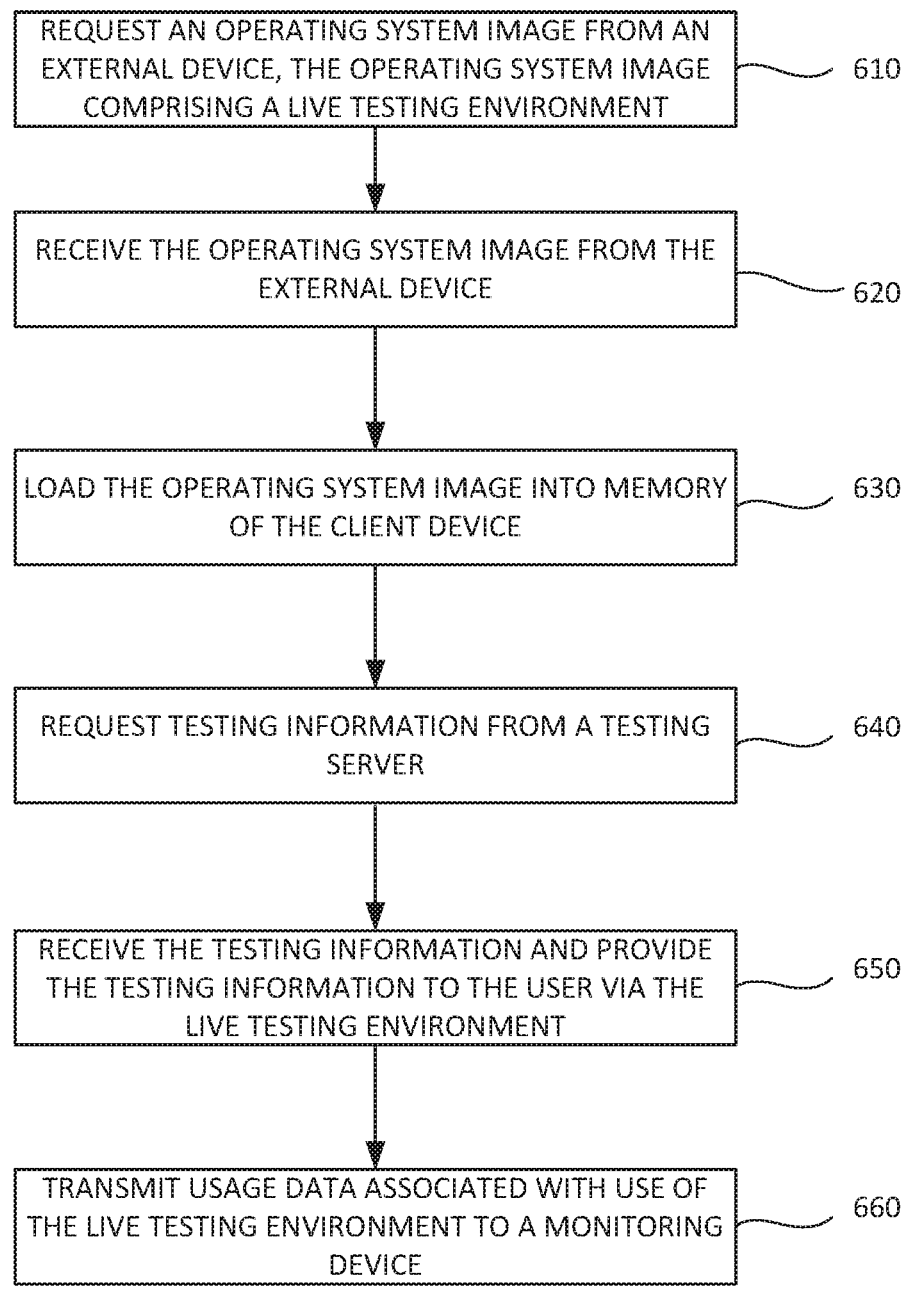
FIG. 6 is a flow diagram of a method of initiating a live operating system examination environment from a USB, in accordance with some embodiments.

FIG. 6 is a flow diagram of a method 600 of initiating a live operating system testing environment from a USB, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by a live testing environment 115.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 610, where the processing logic requests an operating system image from an external storage device, the operating system image comprising a live testing environment. The external storage device may be a USB flash drive, a compact disk, a server device, or any other storage device. The external storage device may be operatively coupled to a user device (e.g., via a network, a USB connection, or other communication link). The operating system image may comprise a full stack of software including an operating system kernel, OS modules, application software, and any other software to provide the live testing environment.

At block 620, the processing logic receives the operating system image from the external device. At block 630, the processing logic loads the operating system image into memory of the client device. The processing logic may keep the entire operating system image in memory without storing any of the required files in storage (e.g., to disk) of the client device. The processing logic may thus provide the live testing environment to a user from the live operating system executing from memory.

In some embodiments, the operating system image may restrict access to computer resources within the live testing environment. Because the live testing environment is provided by the live operating system, the examinee may be unable to circumvent the access restrictions provided by the live testing environment. For example, the operating system image may be designed to prevent certain actions of a user (e.g., keystroke combinations) that may normally be used to confound other examination software. In one example, the operating system image may be encrypted at the external storage device to prevent modifications to the image.

In some embodiments, the processing logic may be configured to detect if the live testing environment is being executed in a virtual machine. If the processing logic determines that the live testing environment is being executed within a virtual machine, the processing logic may transmit a message to an exam proctor, exam monitor, or other authority that the live examination environment is being executed in a virtual machine. In another example, the processing logic may prevent the live examination environment from being executed within a virtual machine. For example, if the processing logic detects that the live examination environment is booted in a virtual machine, the processing logic may stop the live examination environment, indicate that the live exam environment cannot be executed in a virtual machine, crash the boot, etc.

At block 640, the processing logic requests the testing information from a testing server. At block 650, the processing logic receives the testing information from the testing server and provides the testing information to the user via the live testing environment. In one example, the testing information is provided to the examinee via a browser accessing the testing information on the server. In another embodiment, the processing logic retrieves the testing information and loads the testing information into memory of the client device to be accessed locally.

At block 660, the processing logic transmits usage data associated with the live testing environment to a monitoring device. The live testing environment may be associated with an identifier of the examinee or examinee's device. The processing logic may send usage data of the live testing environment along with the identifier to a remote server for monitoring of the provenance and usage of the image.

Figure 7:
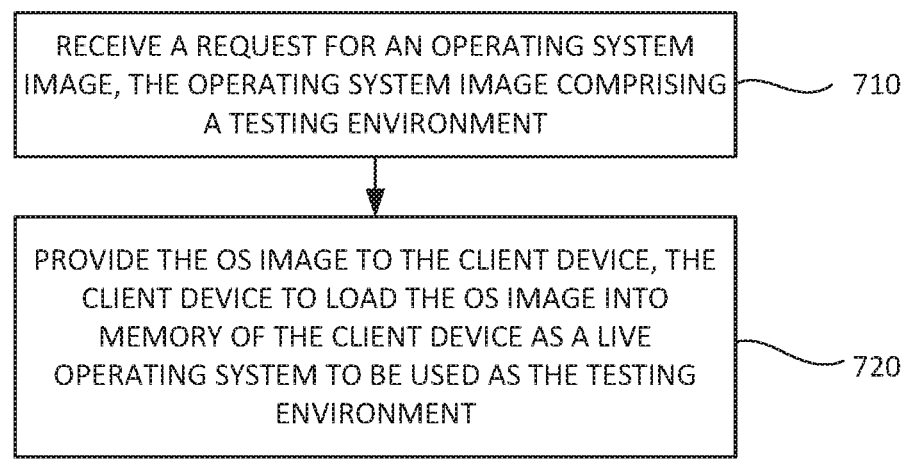
FIG. 7 is a flow diagram of a method of providing a live operating system testing environment, in accordance with some embodiments.

FIG. 7 is a flow diagram of a method 700 of monitoring instantiation and use of a live operating system testing environment, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by a live testing environment 115.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Method 700 begins at block 710, where the processing logic receives a request for an operating system image, the operating system image comprising a testing environment.

At block 720, the processing logic provides the OS image to the client device, the client device to load the OS image into memory of the client device as a live operating system to be used as the testing environment. The testing environment may be a live operating system environment in which an examination can be provided to a user and in which usage and access to computer resources can be restricted.

Figure 8:
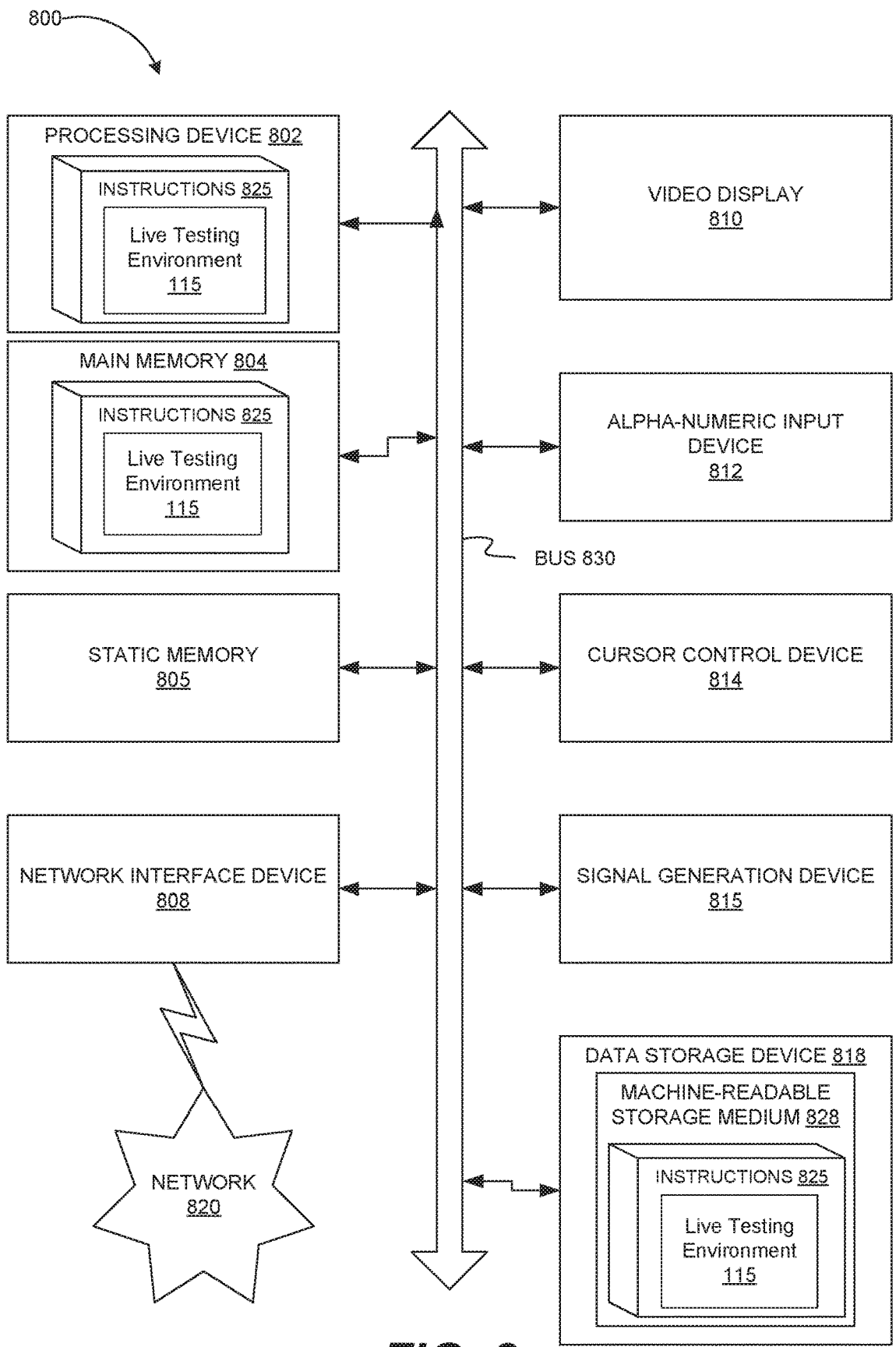
FIG. 8 is a block diagram of an example apparatus that may perform one or more of the operations described herein, in accordance with some embodiments of the present disclosure.

FIG. 8 is a block diagram of an example computing device 800 that may perform one or more of the operations described herein, in accordance with some embodiments. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions 825 that may include instructions for a live operating system testing environment, e.g., live operating system testing environment 115 for carrying out the operations described herein, in accordance with one or more aspects of the present disclosure. Instructions 825 may also reside, completely or at least partially, within main memory 804 and/or within processing device 802 during execution thereof by computing device 800, main memory 804 and processing device 802 also constituting computer-readable media. The instructions 825 may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising receiving, by a processing device of a client device from an external storage device, an operating system image, the operating system image to provide a testing environment for the client device; loading the operating system image into memory of the client device; and providing, by the processor of the client device, testing information via the testing environment.

Example 2 is the method of Example 1, wherein the testing environment comprises resource access restrictions to prevent access to one or more computer resources in view of a testing policy.

Example 3 is the method of Examples 1 or 2, wherein loading the operating system image into memory of the client device comprises determining to boot the client device using the operating system image; and loading the operating system image completely into memory of the client device, the operating system image comprising an operating system kernel, operating system modules, and operating system files.

Example 4 is the method of any one of Examples 1-3, further comprising transmitting a request to a testing server for the testing information; and receiving the testing information from the testing server to be provided by the client device via the testing environment.

Example 5 is the method of any one of Examples 1-4, wherein transmitting the request for testing information comprises providing login credential to the testing server.

Example 6 is the method of any one of Examples 1-5, wherein the external storage device is coupled to the client device via a universal serial bus (USB).

Example 7 is the method of any one of Examples 1-6, wherein the external storage device is a network connected server, and wherein loading the operating system image comprises a network boot of the operating system image from the network connected server.

Example 8 is a system comprising a memory to store an operating system; and a processing device operatively coupled to the memory, the processing device to retrieve the operating system image from an external storage device; boot the operating system image into the memory, the operating system image to provide a live testing environment; retrieve testing information from a testing server; and provide the testing information via the live testing environment of the operating system image.

Example 9 is the system of Example 8, wherein to boot the operating system image the processing device is to load the operating system image into the memory; and execute the operating system image as a live operating system environment in the memory.

Example 10 is the system of Examples 8 or 9, wherein the operating system image comprises an operating system kernel comprising restrictions on access to at least one computing resource associated with the system, wherein the restrictions on access are defined in view of an examination policy of a test publisher.

Example 11 is the system of any one of Examples 8-10, wherein the processing device is further to: request the testing information from a testing server, wherein the request comprises one or more logic credentials; and receive the testing information from the testing server.

Example 12 is the system of any one of Examples 8-11, wherein the external storage device is coupled to the processing device and the memory via a universal serial bus (USB).

Example 13 is the system of any one of Examples 8-12, wherein the external storage device comprises a server device.

Example 14 is the system of any one of Examples 8-13, wherein the processing device is further to: in response to determining that the live operating system environment is executing in a virtual machine, transmitting a message to an exam monitor that the live operating system is executing in the virtual machine.

Example 15 is a non-transitory computer-readable storage medium including instructions that, when executed by a processing device, cause the processing device to: request access to an operating system image stored on an external storage device; receive, by the processing device, the operating system image from the external storage device, the operating system image comprising a live testing environment; boot the operating system image into a memory associated with the processing device; and provide, by the processing device, testing information via the live testing environment.

Example 16 is the non-transitory computer-readable storage medium of Example 15, wherein the live testing environment comprises restrictions on access to computer resources.

Example 17 is the non-transitory computer-readable storage medium of Examples 15 or 16, wherein the restrictions on access to computer resources comprise: limited access to network resources; and prevention of access to local file systems associated with the processing device.

Example 18 is the non-transitory computer-readable storage medium of any one of Examples 15-17, wherein the operating system image is loaded directly into memory associated with the processing device via a USB.

Example 19 is the non-transitory computer-readable storage medium of any one of Examples 15-18, wherein the operating system image is loaded directly into memory via a network boot.

Example 20 is the non-transitory computer-readable storage medium of any one of Examples 15-19, wherein the operating system image is encrypted to prevent modification of the operating system image.

Example 21 is the non-transitory computer-readable storage medium of Examples 15-20, the processing device is further to: receive login credentials from an examinee accessing the live testing environment; and retrieve the testing information from a remote server using the login credentials received from the examinee.

Example 22 is a method comprising receiving, from a client device, a request for an operating system image comprising a live testing environment; and providing, to the client device from an external storage device, the operating system image, the operating system image to be loaded into memory of the client device as a live operating system to be used as the live testing environment.

Example 23 is the method of Example 22, further comprising providing, to the client device, testing information to be provided via the live testing environment, wherein the testing information is associated with an examinee.

Example 24 is the method of any one of Examples 22-23, further comprising receiving, from the live testing environment, a request for testing information.

Example 25 is the method of any one of Examples 22-24, wherein the request for testing information comprises login credentials associated with the live testing environment.

Example 26 is the method of any one of Examples 22-25, wherein the external storage device is fully encrypted with full disk encryption.

Example 27 is the method of any one of Examples 22-26, further comprising receiving information about use of the live testing environment.

Example 28 is a method comprising: receiving a request for testing information from a live operating system environment running on a client device, wherein the live operating system environment comprises a testing environment to control access to computer resources of the client device; and providing the testing information to the live operating system environment.

Example 29 is the method of Example 28, further comprising monitoring use of the live operating system environment.

Example 30 is the method of Examples 28 or 29, wherein monitoring use of the live operating system environment comprises identifying the client device on which the live operating system is running.

Example 31 is the method of any one of Examples 28-30, wherein the live operating system environment controls access to the computer resources based on testing restrictions defined by a test publisher.

Example 32 is an apparatus comprising means for executing a live operating system on a client device, the live operating system comprising a testing environment; means for retrieving testing information for the testing environment; means for providing a testing interface via the client device; and means for restricting access to at least one computer resource associated with the client device.

Example 33 is the apparatus of Example 32, wherein executing the live operating system comprises receiving an operating system image from an external storage device; and loading the operating system image into memory of the client device.

Example 34 is the apparatus of Examples 32 or 33, further comprising means for transmitting a request to a testing server for the testing information; and means for receiving the testing information from the testing server.

Example 35 is the apparatus of any one of Examples 32-34, wherein the external storage device is coupled to the computing device via a universal serial bus (USB).

Example 36 is the apparatus of any one of Examples 32-35, wherein the external storage device is a network connected server, and wherein loading the operating system image into memory of the client device comprises a network boot of the operating system image.

Example 37 is the apparatus of any one of Examples 32-36, wherein restricting access to computer resources comprises means for limiting access to network resources; and preventing access to local file systems associated with the processing device.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving, by a processing device of a client device from an external storage device, an operating system image, the operating system image to provide a testing environment for the client device, wherein the testing environment comprises a live operating system environment with resource access restrictions to prevent access to resources that are not associated with an examination;

loading the operating system image into memory of the client device; and providing, by the processing device of the client device, testing information via the testing environment after loading the operating system image into memory of the client device.

2. The method of claim 1, wherein the resource access restrictions prevent access to one or more local file systems in view of a testing policy.

3. The method of claim 1, wherein loading the operating system image into memory of the client device comprises:
determining to boot the client device using the operating system image; and
loading the operating system image completely into memory of the client device, the operating system image comprising an operating system kernel, operating system modules, and operating system files.

4. The method of claim 1, further comprising:
transmitting a request to a testing server for the testing information; and
receiving the testing information from the testing server to be provided by the client device via the testing environment.

5. The method of claim 4, wherein transmitting the request for testing information comprises providing login credential to the testing server.

6. The method of claim 1, wherein the external storage device is coupled to the client device via a universal serial bus (USB).

7. The method of claim 1, wherein the external storage device is a network connected server, and wherein loading the operating system image comprises a network boot of the operating system image from the network connected server.

8. A system comprising:
a memory to store an operating system image; and
a processing device operatively coupled to the memory, the processing device to:
retrieve the operating system image from an external storage device;
boot the operating system image into the memory, the operating system image to provide a live testing environment, wherein the live testing environment comprises resource access restrictions to prevent access to computing resources that are not associated with an examination;
retrieve testing information from a testing server; and
provide the testing information via the live testing environment of the operating system image after the boot of the operating system image into memory.

9. The system of claim 8, wherein to boot the operating system image the processing device is to:
load the operating system image into the memory; and
execute the operating system image as a live operating system environment in the memory.

10. The system of claim 9, wherein the operating system image comprises an operating system kernel comprising restrictions on access to at least one local file system associated with the system, wherein the restrictions on access are defined in view of an examination policy of a test publisher.

11. The system of claim 8, wherein the processing device is further to:
request the testing information from a testing server, wherein the request comprises one or more logic credentials; and
receive the testing information from the testing server.

12. The system of claim 8, wherein the external storage device is coupled to the processing device and the memory via a universal serial bus (USB).

13. The system of claim 8, wherein the external storage device comprises a server device.

14. The system of claim 8, wherein the processing device is further to:
in response to determining that the live operating system environment is executing in a virtual machine, transmitting a message to an exam monitor that the live operating system is executing in the virtual machine.

15. A non-transitory computer-readable storage medium including instructions that, when executed by a processing device, cause the processing device to:
request access to an operating system image stored on an external storage device;
receive, by the processing device, the operating system image from the external storage device, the operating system image comprising a live testing environment, wherein the live testing environment comprises resource access restrictions to prevent access to computing resources that are not associated with an examination;
boot the operating system image into a memory associated with the processing device; and
provide, by the processing device, testing information via the live testing environment after the boot of the operating system image into the memory.

16. The non-transitory computer-readable storage medium of claim 15, wherein the live testing environment comprises restrictions on access to computer resources that are not indicated as allowed by the examination.

17. The non-transitory computer-readable storage medium of claim 16, wherein the restrictions on access to computer resources comprise:
limited access to network resources; and
prevention of access to local file systems associated with the processing device.

18. The non-transitory computer-readable storage medium of claim 15, wherein the operating system image is loaded directly into memory associated with the processing device via a USB.

19. The non-transitory computer-readable storage medium of claim 15, wherein the operating system image is encrypted to prevent modification of the operating system image.

20. The non-transitory computer-readable storage medium of claim 15, the processing device is further to:
receive login credentials from an examinee accessing the live testing environment; and
retrieve the testing information from a remote server using the login credentials received from the examinee.

* * * * *